Figure 6:
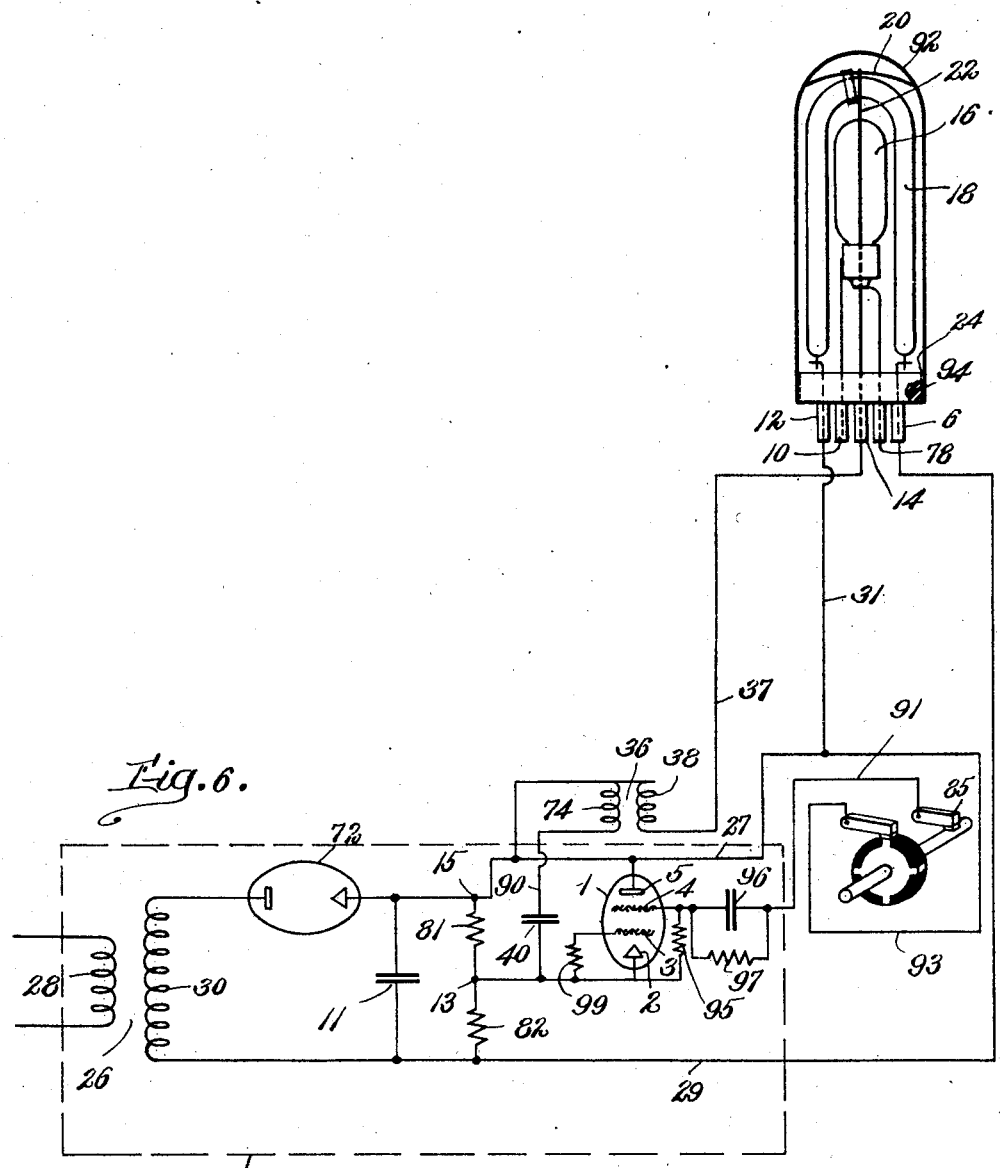

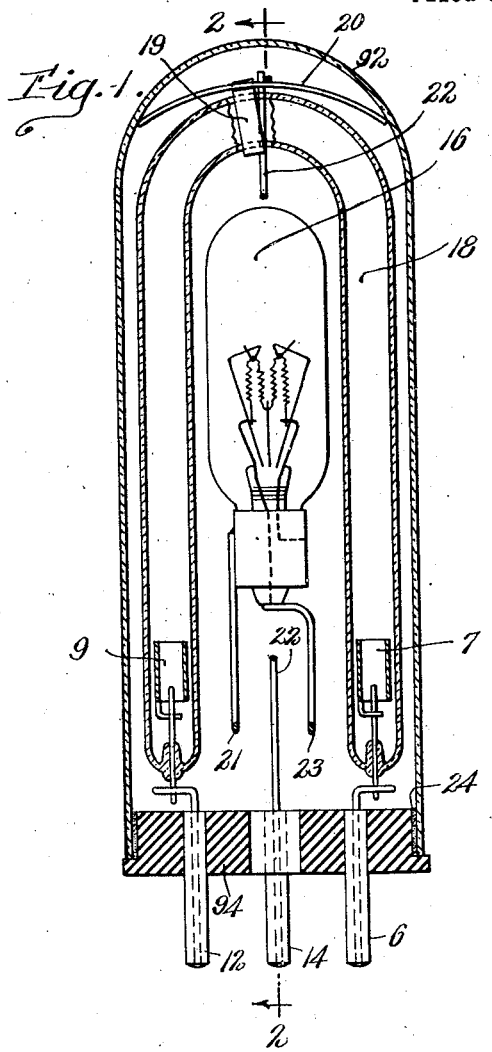

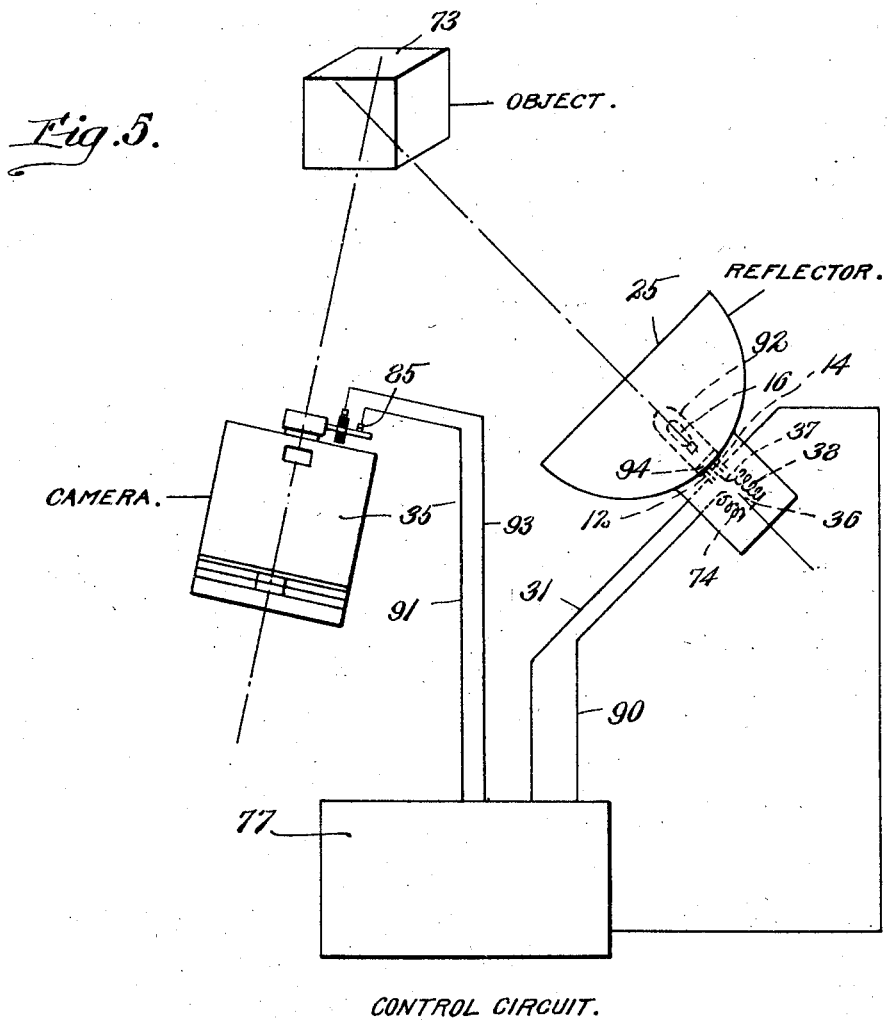

March 31, 1942.  H. E. GRIER  2,277,697
ELECTRIC SYSTEM AND APPARATUS
Filed Jan. 31, 1939  3 Sheets-Sheet 3

Inventor.
HERBERT E. GRIER
by David Rines
Atty.

Patented Mar. 31, 1942

2,277,697

UNITED STATES PATENT OFFICE 2,277,697

ELECTRIC SYSTEM AND APPARATUS

Herbert Earle Grier, Cambridge, Mass.

Application January 31, 1939, Serial No. 253,760

12 Claims. (Cl. 176—1)

The present invention relates to electric systems and apparatus, and more particularly to systems and apparatus designed for flash photography.

In such systems, a gaseous-discharge flash-lamp is ordinarily employed to produce the exposure flash for illuminating the object to be photographed. The photographer trips the flash-lamp to produce the exposure flash at a time when satisfied, through observation, that the object to be photographed will yield the best results on the photographic plate or film. This observation the photographer makes with the aid of an incandescent lamp or other light-source prior to tripping the flash-lamp.

The location of the incandescent lamp or other light source has heretofore been more or less haphazard. It has been rather common, for example, to position the incandescent lamp in one part of the room and the flash-lamp in another, these lamps thus directing their rays upon the object to be photographed from different directions. Under such circumstances, of course, the object will appear on the photographic film or plate under different light conditions from those under which the photographer viewed it with the aid of the incandescent lamp prior to the exposure flash. It frequently results, therefore, that the shades and shadows on the photograph are not what the photographer expected.

It is accordingly an object of the present invention so to position the light-source and the flash-lamp that their fields of illumination shall have approximately the same center.

To the attainment of this end, according to a preferred embodiment of the invention, the light-source and the flash-lamp are combined in a single unit to constitute what may be termed a novel dual lamp. With the aid of this dual lamp, the pre-view lighting and the photographing take place under almost identical conditions.

Another object is to provide a dual lamp of this character the flash-lamp of which shall produce a very brilliant flash for a very brief period of time. This renders it possible to employ a continuous very much weaker light-source that need not be extinguished during the exposure flash. Experience shows that, despite the brilliancy of the flash, it is not disturbing to the person to be photographed because of the shortness of its duration.

A further object is to combine the novel dual lamp with a common reflector so positioned relative to the flash-lamp and the light-source that the fields of illumination reflected therefrom upon the object to be photographed shall have approximately the same center.

A further object is to provide a novel dual lamp comprising a high-voltage flash-lamp combined with a continuous source of light, such as an incandescent lamp.

Another object is to provide a novel system of photography utilizing a dual lamp of the above-described character comprising a flash-lamp and a weaker continuous light-source the flash-lamp for producing the exposure, and the weaker continuous light for lining up the reflector, focusing the camera, minimizing the effect of the flash on the eye, and/or pre-fogging the film to raise the sensitivity of the film to the flash light.

Another object is to provide a dual lamp of the above-described character in which the high-voltage apparatus, as well as the light-source, shall be enclosed in an outside tube or bulb for protecting the operator from the high voltage.

Other and further objects will be described hereinafter and will be particularly pointed out in the appended claims.

The invention will now be described more fully in connection with the accompanying drawings, in which Fig. 1 is a longitudinal section of a preferred embodiment of the invention, taken upon the line 1—1 of Fig. 2, looking in the direction of the arrows; Fig. 2 is a similar section, taken approximately upon the line 2—2 of Fig. 1, looking in the direction of the arrows; Fig. 3 is a plan; Fig. 4 is an underside plan; Fig. 5 is a diagrammatic view illustrating a practical application of the invention; and Fig. 6 is a view of a circuit diagram that may be embodied in Fig. 5.

According to the specific embodiment of the invention illustrated, an elongated light-permeable glass-bulb jacket or envelope 92 is cemented at 24 to a flat, insulating base 94 provided with five pin terminals 6, 10, 12, 14 and 18 projecting exteriorly thereof. The envelope 92 may be either clear or frosted; in the latter case, it will yield a better distribution of the light when used with conventional reflectors, such as the reflector 25. In the envelope 92, a continuous modelling or guide-lamp light-source, such as an incandescent lamp 16, is mounted between the arms of the U of a U-shaped flash-lamp 18, that may contain krypton or any other suitable gas. The axis of the U is shown substantially coinciding with, or is parallel to, the axis of the bulb 92. The flash-lamp 18 is provided with two terminals, constituted of a cathode 7 and an anode 9, connected, respectively, to the terminals 6 and 12. The parts are held permanently steady in correct position, and properly lined up, in the bulb 92, by means of suitable metal spreaders 20. A high-voltage spark trigger or trip wire electrode 22 is so mounted in the bulb 92 as to occupy its optimum position. One end of the wire 22 is provided with a terminal 17 that is connected to the terminal 14, and its other end is free, as shown. The wire 22 may be spiraled in the form of a coil around the tube 18, but it is shown as extending alongside the tube 18, to a band 19 encircling the tube 18. The lamp 16 is provided with terminals 21 and 23 that are respectively connected to the terminals 78 and 10. Two of the pin terminals 6, 10, 12, 14 and 78 are thus connected to the terminals 21 and 23 of the lamp 16, two to the anode and the cathode terminals 7 and 9 of the flash-lamp 18, and one to the terminal 17 of the wire 22.

The incandescent lamp 16 may provide continuous illumination for the purpose of focusing the reflector 25 upon an object or person 73, while pointing the reflector 25 in the right direction; and then, with the parts set in this manner, as desired, a photograph of the object may be taken by a camera 35, with the aid of the flash-lamp 18. As the reflector 25 has already been previously pointed, and the camera 35 has previously been focussed by means of the incandescent lamp 16, the light of the flash-lamp 18 will be certain to cover the area 73 that the camera has been focussed upon. Because of the above-described relative locations of the light-source 16 and the flash-lamp 18 relative to the common reflector 25, with the axis of the reflector substantially coincident with, or parallel to, the substantially common axis of the lamps 16 and 18, the reflector thus produces reflected fields of illumination from the flash-lamp 18 and the light-source 16 that have approximately the same center. The illumination of the light-source 16 and of the flash-lamp 18 comes from exactly the same direction, and the same shades and shadows produced in the one case are produced in the other. A faithful preview is thus provided by the lamp 16 of the light balance that will appear in the photograph.

Photographers rely upon the positioning of the lights to produce certain lighting effects. Without an incandescent modelling or guide lamp, the photographer can not study the lighting, and hence can not produce pictures that are lighted to the best advantage. The use of the incandescent modelling lamp 16, positioned so that its field of illumination shall have approximately the same center as that of the field of illumination of the flash-lamp 18, enables the photographer to place the lamps at a position that gives him the desired modelling and allows him to study the lighting at his leisure.

By operating the flash-lamp 18 during the illumination of the incandescent lamp 16, furthermore, the startling flash may be rendered barely perceptible, without eye discomfort. No harm is produced by having the two lamps 16 and 18 on together during the brief interval of the flash because of the tremendously greater light produced by the flash-lamp compared with the light of the incandescent lamp 18. It is thus possible to carry out the work of flash photography with as little flash effect as possible upon the eyes of the person 73 being photographed. This is obviously an advantage in photographing children, whose eyes retain their normal pupil size during the flash, and for similar purposes. Also, the light from the incandescent lamp 16 helps to overcome the inertia of the film, thereby increasing the effective speed of the film to the flash-lamp 18. This, in effect, is prefogging the film to increase the sensitivity.

The bulb 92 containing the flash-lamp 18 and the incandescent lamp 16 may, however, be so positioned as to eliminate the necessity for employing the reflector 25; and the camera 35 may, furthermore, if desired, be focussed with the aid of auxiliary apparatus.

Because of the relatively high voltage to which lamps like the lamp 18 are usually subjected, the user may become subjected to electric shock. Since the high voltage of the gaseous-discharge flash-lamp 18 is isolated by means of the protective glass jacket or envelope 92, however, so as to render the flash-lamp 18 and the trigger wire 22 harmless, no harm can come to either the operator or the object 73. This is effected without preventing the light of the flash from the flash-lamp 18 or the light from the incandescent lamp 2 from penetrating the light-permeable envelope 92.

The apparatus must be used in conjunction with a control circuit 77, such as shown in Fig. 6 and diagrammatically indicated in Fig. 5. The flash-lamp 18 is shown connected, through the medium of the terminal pins 12 and 6, across a condenser 11. To this end, the terminal pin 12 is connected to a terminal 15 at one side of the condenser 11 by conductors 31 and 27; and the terminal pin 6 is connected to the other side of the condenser 11 by a conductor 29. The condenser 11 may be subjected to a voltage of, say, 2000 volts from any direct-current supply. In Fig. 6, the preferred supply is shown as a transformer 26, the primary winding 28 of which may be connected to any desired source of alternating energy of the correct voltage and frequency, and the secondary winding 30 of which may be connected to the condenser 11 through a rectifier 72. The secondary winding 30 may have a high impedance for performing the normal current-limiting function of a charging impedance, thus eliminating the necessity for the use of a separate charging resistor or other impedance between the secondary winding 30 and the charging condenser 11. A separate charging impedance (not shown) may be employed, if desired. The secondary winding 30 should be so designed that the short-circuit current shall be limited not to exceed the peak rating of the associated rectifier tube 72.

For simplicity, the connections to a source of power for the lamp 16, through the medium of the terminals 10 and 78, are omitted from Fig. 6. The lamp 16 is generally connected in parallel with the primary winding 28 of the transformer 26.

A trigger tube 1 may be connected to terminals 15 and 13, across a bleeder resistor 81, so as to be supplied with voltage therefrom. The bleeder resistor 81 is connected, in series with a bleeder resistor 82, across the condenser 11, which constitutes the main power-supply for the tube 1. Power for the tube 1 may, however, be obtained, if desired, from a separate power-supply. The trigger tube 1 and the power supply may be remotely positioned with respect to the remainder of the control circuit and the flash-lamp. The resistors 81 and 82 are so proportioned that a desired voltage of, say, 300 volts shall appear across the terminals 13 and 15 of the resistor 81. To the terminals 13 and 15 there are also connected, in parallel with the tube 1, in series with a condenser 40, a primary winding 74 of a transformer 36. One side of the condenser 40 is connected to the terminal 13 and the other side, by way of a conductor 90 to the primary winding 74. The secondary winding 38 of the transformer 36 is connected, by a conductor 37, to the wire 22 to produce the high-voltage triggering spark. It will be observed that the terminal 17 of the trip wire 22 is alone connected to the secondary winding 38. The return path is by capacity coupling of the wire 22 to the electrode of the lamp 18.

The tube 1 may be of the cold-cathode gaseous-discharge type illustrated and described in Letters Patent 2,185,189, 2,201,166 and 2,201,167, issued to Kenneth J. Germeshausen on January 2 and May 21, 1940. It may comprise an evacuated glass envelope filled with a suitable gas, such as neon, or any of the other noble gases, such as argon or helium. The tube contains several electrodes, namely, a solid cathode 2, an anode or plate 5, and one or more grids, inner and outer grids being shown at 3 and 4, between the anode 5 and the cathode 2. Either grid may be used as the control grid, depending upon the polarity and the magnitude of the control voltage. In single-grid tubes, the grid 3, for example, may be omitted; or, if present, it may simply not be connected into circuit. An impedance 95 is connected between the cathode 2 and the grid 4, and an impedance 99 between the cathode 2 and the grid 3. As explained in the said Letters Patent, the source of the electrons is a bright cathode spot on the surface of the cathode 2.

The flash-lamp 18 may be tripped by means of a hand-controlled switch (not shown) or, as illustrated, by an automatically operated contactor 85 that is shown connected across the anode or plate 5 and one of the grids 4 of the tube 1. The contactor 85 may be actuated by the object being photographed, or, as shown, by the camera shutter. The connections may be traced from the grid 4, through a blocking condenser 96 and a leak resistor 97, in parallel, by way of a conductor 91, through the contactor 85, and by way of a conductor 93 and the conductor 27, to the anode 5. The trigger tube 1 is thus, through the contactor 85 connected to its grid 4, caused to flash the flash-lamp 18 at the desired instant. The grid 4 may also be actuated by a photoelectric cell or by a microphone through a suitable amplifier.

In the operation of the circuit, the condenser 11 starts to become charged from the direct-current source 26, 72, the tube 1 being non-conductive. The source charges the condenser 40, at the same time, through the resistor 81 and the primary winding 74. At any time after the voltage across the condenser 11 reaches its maximum value, the contactor 85 may be caused to function, raising the potential of the grid 4 until the break-down voltage between the grid 4 and the cathode 2 or the grid 4 and the grid 3 is exceeded, and the trigger tube 1 becomes conducting. The condenser 40 then discharges through the condenser-discharge circuit comprising the tube 1 and the primary winding 74 of the transformer 36. The resulting voltage surge of the secondary winding 38 of the transformer 36 is applied to the trigger electrode 22 of tube 18. This causes the gas in the tube 18 to ionize, permitting the condenser 11 to discharge through the flash-lamp 18 between its electrodes, producing a very brilliant flash of short duration. When the condenser 11 is fully discharged, the tube extinguishes and the cycle is ready for repetition. It will be noted that when the condenser 11 is fully discharged, the voltage across the resistor 81 is zero, preventing the condenser 40 from charging again and allowing the tube to deionize. The time taken for the circuit to function from the closing of the contactor 85 to the flash of light from the tube 18 is very brief.

With the aid of this invention, it is possible to produce a very brilliant flash of light for a very brief period of time at any desired instant for taking photographs. As the light-source 16 and the flash-lamp 18 are positioned so that their fields of illumination shall have approximately the same center, it is possible also to provide the auxiliary continuous lamp 16 in the same unit with the flash-lamp 18 so as to yield about the same light distribution from the reflector 25 as would the flash-lamp 18 itself. Apparatus of this character is particularly useful in determining what part of the subject to be photographed is being illuminated; and also for focussing, once the desired distribution of light has been obtained. Further, if the contactor 85 is constructed in the camera shutter, and synchronized therewith, it is possible to expose the film for a brief interval to the incandescent light before the flash lamp is fired. This exposure to the continuous light pre-fogs the film, thereby raising the sensitivity of the film to the subsequent flash.

Modifications will occur to persons skilled in the art and all such are considered to fall within the scope and spirit of the invention.

What is claimed is:

1. Apparatus of the character described having, in combination, a continuous light source, such as an incandescent lamp, and a flash-lamp, the light source and the flash-lamp having substantially a common axis.

2. Apparatus of the character described having, in combination, an incandescent lamp, a flash-lamp, the incandescent lamp and the flash-lamp having substantially a common axis, and a reflector having an axis substantially coincident with the common axis.

3. Apparatus of the character described having, in combination, an incandescent lamp, a flash-lamp, the incandescent lamp and the flash-lamp having substantially a common axis, and a reflector having an axis substantially coincident with the common axis, the lamps yielding approximately the same light distribution from the reflector.

4. Flash-photography apparatus having, in combination, a high-voltage U-shaped flash-lamp for producing an exposure flash, a high-voltage spark trigger-wire for the flash-lamp, a light-source for illuminating the object to be photographed, and a protective envelope in which the flash-lamp, the trigger-wire and the light-source are contained to protect the operator from the high voltage of the flash-lamp and the trigger-wire, the protective covering having an axis substantially coinciding with, or parallel to, the axis of the U, and the light-source being positioned along the said axis of the U between the arms of the U.

5. Flash-producing apparatus having, in combination, a reflector having an axis, a high-voltage flash-lamp for producing an exposure flash disposed in the reflector and having an axis substantially coincident with, or parallel to, the reflector axis, and a light-source disposed substantially along the reflector axis to facilitate alining the reflector upon a object to be photographed.

6. Flash-producing apparatus having, in combination, a reflector having an axis, a high-voltage flash-lamp for producing an exposure flash, a light-source, and a protective envelope in which the flash-lamp and the light-source are contained to protect the operator from the high voltage of the flash-lamp, the protecting envelope being disposed in the reflector and having an axis substantially coincident with, or parallel to, the reflector axis, and the light-source being disposed substantially along the reflector axis to facilitate alining the reflector upon an object to be photographed.

7. Flash-photography apparatus having, in combination, a high-voltage U-shaped flash-lamp for producing an exposure flash, a high-voltage spark trigger-wire for the flash-lamp, a light-source for illuminating the object to be photographed, a protective envelope in which the flash-lamp, the trigger-wire and the light-source are contained to protect the operator from the high voltage of the flash-lamp and the trigger-wire, the protective envelope having an axis substantially coinciding with, or parallel to, the axis of the U, the light-source being positioned along the said axis of the U between the arms of the U, and a reflector in which the protective envelope is positioned, the reflector having an axis substantially alined with the axis of the protective envelope.

8. Apparatus for use in photography having, in combination, a light-source, and a flash-lamp for producing a very brilliant flash for a very brief period, the light-source and the flash-lamp being positioned so that their fields of illumination shall have approximately the same center.

9. Apparatus for use in photography having, in combination, a light-source, a flash-lamp for producing a very brilliant flash for a very brief period, and a common reflector for the light-source and the flash-lamp, the light-source and the flash-lamp being positioned relative to the reflector so that the reflected fields of illumination shall have approximately the same center.

10. Apparatus for use in photography having, in combination, a light-source, a flash-lamp for producing a very brilliant flash for a very brief period, and a light-permeable envelope in which the light-source and the flash-lamp are contained, the light-source and the flash-lamp being disposed in the envelope so that their fields of illumination shall have approximately the same center.

11. Apparatus for use in photography having, in combination, a light-source, a high-voltage flash-lamp for producing a very brilliant flash for a very brief period, and a light-permeable protective envelope in which the light-source and the flash-lamp are contained to protect the operator from the high voltage of the flash-lamp without preventing the light of the flash from penetrating the envelope, the light-source and the flash-lamp being disposed in the envelope so that their fields of illumination shall have approximately the same center.

12. Apparatus for use in photography having, in combination, a light-source, a high-voltage flash-lamp for producing a very brilliant flash for a very brief period, a high-voltage trigger-wire for the flash-lamp, and a light-permeable protective envelope in which the light-source, the flash-lamp and the trigger-wire are contained to protect the operator from the high voltage of the flash-lamp and the trigger-wire without preventing the light of the flash from penetrating the envelope, the light-source and the flash-lamp being disposed in the envelope so that their fields of illumination shall have approximately the same center.

HERBERT E. GRIER.